Feb. 5, 1946.     H. A. ROSE     2,394,013
VAPOR ELECTRIC DEVICE
Filed April 14, 1944     2 Sheets-Sheet 1

WITNESSES:
E. A. McCloskey
Nw. C. Groome

INVENTOR
Herbert A. Rose.
BY S. A. Shickled
ATTORNEY

Patented Feb. 5, 1946

2,394,013

UNITED STATES PATENT OFFICE 2,394,013

VAPOR ELECTRIC DEVICE

Herbert A. Rose, Pittsburgh, Pa., assignor to Westinghouse Electric Corporation, East Pittsburgh, Pa., a corporation of Pennsylvania Application April 14, 1944, Serial No. 531,093

7 Claims. (Cl. 175—363)

My invention relates to a vapor electric device and, particularly, to a control system for regulating the output of a vapor electric converter over a wide angle of control.

In the commercial application of vapor electric converters, it is frequently desirable to provide very accurate control of the output of a vapor electric converter over wide control ranges. For example, it is sometimes desirable to provide accurate control at a plurality of voltages or to provide accurate control over a wide variety of load ranges; for example, in tin reflowing it is desirable to maintain an accurate temperature control over widely varying load conditions.

According to my invention, I have provided a converter preferably of the make-alive type in which a plurality of phase shifting means are used to accurately control the output of the converter. A primary phase shifting means is provided having very accurate control over a relatively small angle of control and a secondary phase shifting means operative over any desired control range to maintain the control point within the optimum range of the primary phase shifting means.

While it is possible to provide both the fine and broad control with separate operating means, I prefer to so interlock the phase controllers that the fine control operates the broad control so that the fine control is always in the proper operating range.

I have provided the primary control in the form of a phase shifting reactor in the wave distorter circuits supplying excitation impulses to the make-alive type valves and control the saturation of the phase shifting reactor by means of a variable resistor, preferably of the type known commercially as the "Silverstat." The actuating element of the variable resistor is controlled in response to predetermined or selected load conditions, such as voltage, current, speed, or temperature, and this actuating mechanism is provided with a limit switch so that when the variable resistor is either in its full resistance or non-resistant condition, a limit switch will actuate a rotary phase shifting device which will shift the phase so that the primary phase shifter is always in its optimum operating range.

It is, accordingly, an object of my invention to provide a control system operable with maximum accuracy over a wide control range.

It is a further object of my invention to provide a rectifier system operable under a variety of load conditions.

It is a further object of my invention to provide a rectifier having a coarse and fine adjustment over a predetermined load range.

It is a further object of my invention to provide a control system to produce any predetermined output conditions on a vapor electric converter.

Other objects and advantages of my invention will be apparent from the following detailed description taken in conjunction with the accompanying drawings, in which.

Figure 1:
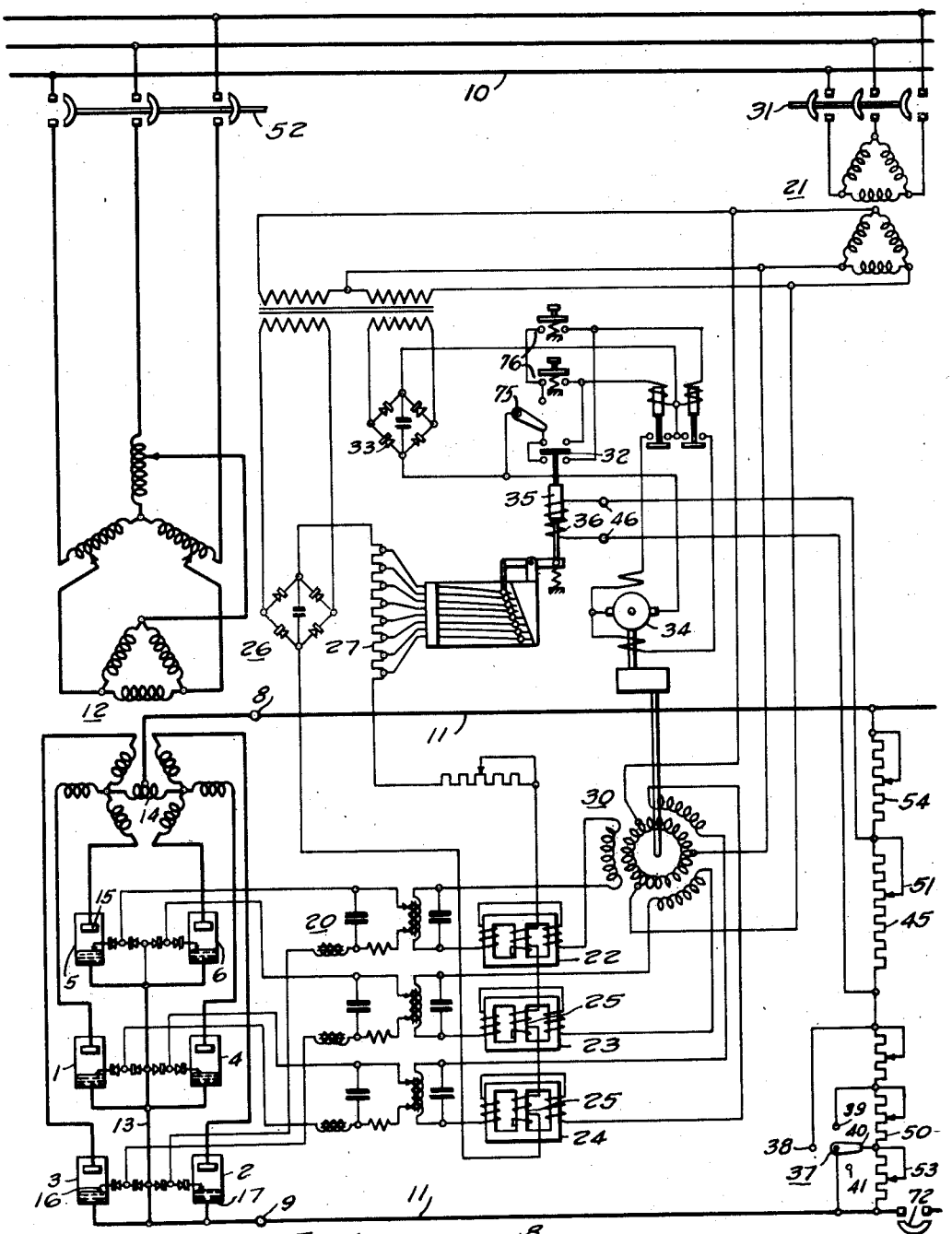
Figure 1 is a schematic illustration of a vapor electric converter according to my invention.

In the illustrated embodiment of my invention according to Fig. 1, an alternating-current circuit 10 is connected to a load circuit 11 by means of a plurality of vapor electric valves 1 to 6 of the make-alive type. The valves 1 to 6 are connected by means of a transformer herein shown as a double three-phase transformer 12 through a disconnecting switch 52 to the alternating-current circuit 10, while the valves 1 to 6 are also connected by means of a common cathode connection 13 and the interphase transformer 14 of the rectifier transformer 12 to the terminals 8 and 9 of the load circuit 11 which is preferably provided with a circuit breaker 72.

Each of the make-alive type valves is provided with an anode 15 and an excitation electrode, usually in the form of a high resistance electrode 16 making contact with the cathode 17, and the excitation electrode 16 is supplied with current impulses by means of any suitable impulsing system, herein illustrated as of the wave distorter or so-called reactor firing type. The wave distorter networks 20 are supplied with energy from any suitable source of periodic potential, herein illustrated as a transformer 21 connected by means of circuit breaker 31 to the alternating-current circuit 10.

The primary phase control is provided by means of variable reactors 22, 23 and 24 associated with the wave distorter networks 20, the reactance of the variable reactors 22, 23 and 24 is controlled by means of windings 25 energized from a suitable source 26 of direct current. The current flowing in the windings 22, 23 and 24 is controlled by a variable resistor 27 preferably in the form of a "Silverstat." Interposed between the source 21 and the wave distorter networks 20 is a phase shifter having a wide angle of adjustability preferably in the form of a rotary phase shifter 30 which is controlled by means of a reversible motor 34 energized through suitable switching means 32 from a source of direct current, herein illustrated as a bridge type rectifier 33 energized from the alternating-current circuit 10.

The actuating mechanism for the variable resistor 27 is provided in the form of a movable armature 35 for a coil 36 energized in response to the load condition to be controlled.

In Fig. 1, a drum controller 37 having a plurality of contacts 38, 39, 40 and 41 is provided for controlling the voltage across a resistor element 45, and the voltage across the resistor element 45 is connected to the terminals 46 of the coil 36. The armature 35 which controls the variable resistor 27 is provided with a limit switch 32 so that when the variable resistor 27 is actuated to its limit in either direction, the limit switch 32 will energize the motor 34 operating the rotary phase shifter 30 which then adjusts the phase until such time as the voltage across the resistor 45 is such that the variable resistor 27 is operating within its optimum operating range.

The drum controller 37 may be either of the type which will select a plurality of voltages or may select any voltage within the minimum and maximum range of the converter and will maintain the voltage constant at the selected value.

In the operation of the system, referring to Fig. 1, the switch 31 will be closed to energize the impulsing systems 20, after which the switch 52 would be closed to energize the converter and supply potential to the direct-current circuit 11. The drum controller 37 would be actuated to select any desired voltage. The drum controller 37 thus controls the voltage drop across the resistor 45, and according to the voltage appearing across the resistor 45, the variable resistor 27 in series with the coils 25 of the phase shifting reactors 22, 24 would operate to raise or lower the voltage of the converter by advancing or retarding the firing angle in the vapor electric valves 1 to 6. As soon as the phase shifters have adjusted the voltage to the selected value, they would be operative to maintain this voltage at the selected value regardless of variations in load conditions.

If it is desired to utilize a drum controller 37 having a predetermined number of individual steps, the control would preferably be provided by a tapped resistor 50, and the selector switch for controlling in steps the voltage across the control resistor 45. The control resistor 45 may be provided with an adjustable contactor 51 for varying its resistance to various coil elements 36. If desired, a ballast resistor 54 may be utilized to increase the sensitivity of the control resistor 45.

When it is desired to utilize a drum controller having a smooth variation over the entire voltage range, it is desirable to provide vernier means 53 between each of the steps 38 to 41 of the drum controller.

Figure 2:
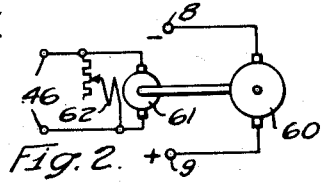
Fig. 2 is a fragmentary illustration of a modified control source for actuating a converter according to my invention.

In the modification according to Fig. 2, I have shown a means for selecting and maintaining a constant speed by means of my control system. A direct-current motor 60 is connected to the terminals 8 and 9 of the direct-current system, and this motor 60 is provided with a speed responsive device such as a tachometer generator 61, the output of which is connected to the terminals 46 of the actuating coil 36 for the variable resistor 27 of the primary phase shifter.

In the operation of this form of the device, the field coil 62 of the tachometer generator 61 will be adjusted until the motor 60 is operating at the desired speed. Any variation in the desired speed will then change the output voltage of the tachometer generator 61 and actuate the phase shifting mechanisms to bring the motor 60 back to the desired speed.

Figure 3:
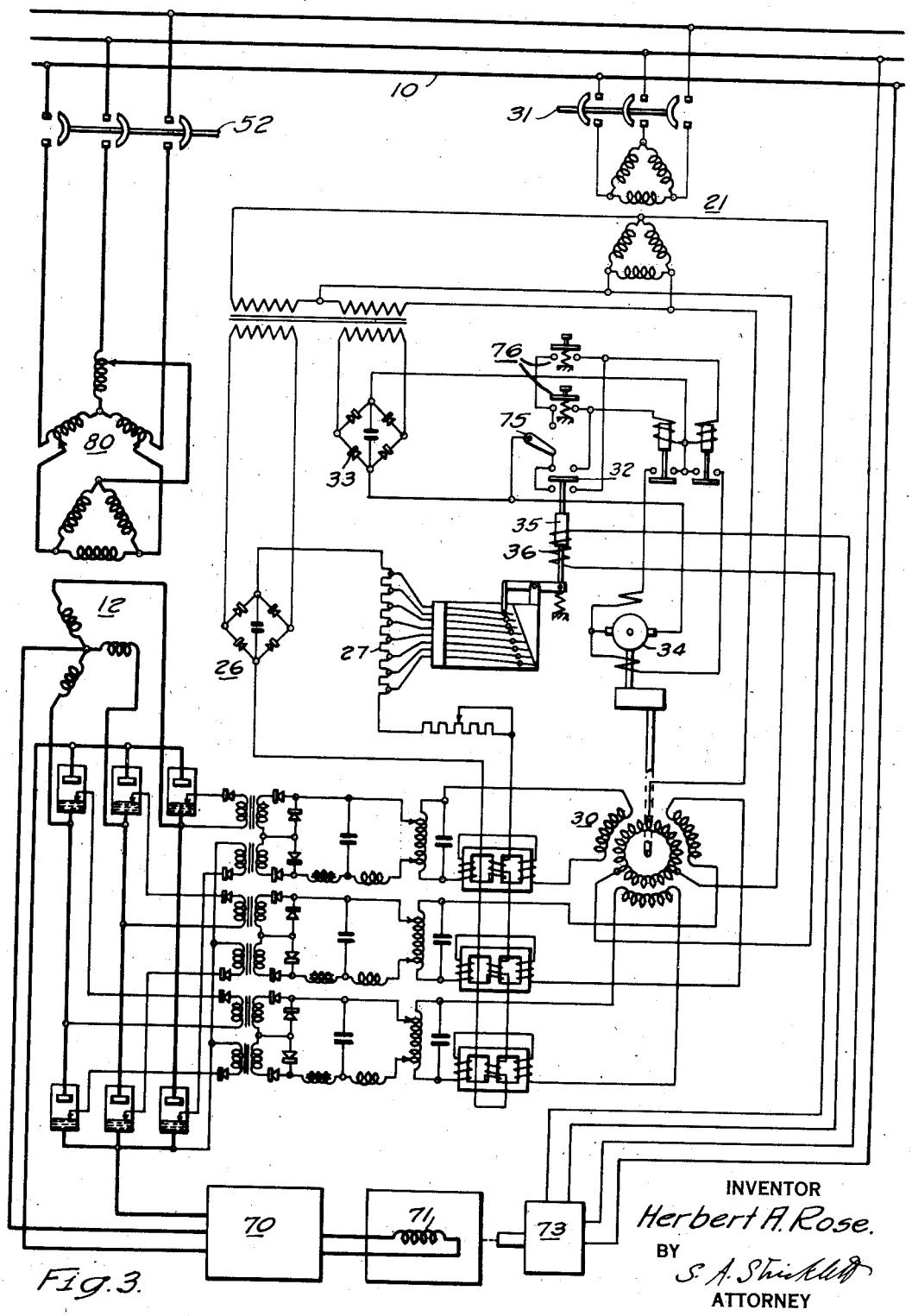
Fig. 3 is a further modification according to my invention.

In the embodiment according to Fig. 3, the double three-phase converter of Figs. 1 and 2 has been replaced by a bridge type converter supplying energy to a load, such as a high frequency oscillator 70 which supplies energy to an induction heating coil 71 such as that used in tin reflowing. In such operations as tin reflowing, it is desirable to maintain a constant temperature regardless of the load conditions in the furnace. For example, during normal operations, the tin sheet will move through the furnace at high velocity, and a large amount of energy is necessary to maintain the proper temperature. However, at intervals, it is necessary to slow down the speed of the tin sheet for purposes of introducing a second sheet or for joining the second sheet to form a continuous sheet, and it is necessary during this interval to reduce the energy output to prevent excessive temperatures from injuring the sheet. For providing a source of control potential for the operating coil 36 of the phase shifting mechanisms, I have provided a temperature responsive device preferably in the form of a photocontroller 73, and any variation in the temperature within the furnace actuates the phase shifters to reduce or increase the energy supplied by the converter and thereby controls the temperature in the furnace.

It is frequently desirable to be able to manually control the secondary phase shifter 30 either for purposes of initially starting the device or for rapidly controlling the converter in the case of emergency. For this reason I have provided a changeover switch 75 which cuts out the limit switch 32 of the phase shifting apparatus and connects in a manual control 76 so that the phase shifter 30 may be manually operated to advance or retard the firing angle of the converter to meet any emergency condition.

When a rectifier operates with a large angle of delay, the resultant power factor is very poor. Consequently, I have provided a voltage regulating autotransformer 80 in series with the rectifier transformer 12, and in the event it is desirable to operate a converter for any lengthy period of time at a large angle of delay or low power output, the autotransformer may be adjusted to reduce the normal output and thus allow operation with an advanced firing angle and thus with maximum power factor consumption.

While for purposes of illustration I have shown and described specific embodiments of my invention, it will be apparent that changes and modifications can be made therein without departing from the true spirit of my invention.

I claim as my invention:

1. An electric current conversion system interconnecting two dissimilar circuits comprising a plurality of make-alive type valves for controlling the flow of energy between the circuits, a source of periodic control potential, an exciting electrode in each of said valves, wave distorter circuits energized from said source and connected to said exciting electrodes for periodically exciting the cathode of each of said valves in sequence, phase shifting means associated with said wave distorter circuits, phase shifting means interposed between said source and said wave distorter circuits, means actuated in response to a predetermined load condition for controlling said first mentioned phase shifting means, and means responsive to a predetermined movement of said load responsive means to actuate said second mentioned phase shifting means.

2. An electric conversion system for supplying a controlled variable voltage load circuit comprising an alternating current supply circuit, a load circuit, a valve type converter interconnecting said circuits, a control electrode for each valve of said converter, a source of alternating control potential, circuit means energized from said source and connected to said control electrode for supplying control impulses thereto, primary phase shifting means for shifting the phase of said control impulses, means responsive to load conditions for actuating said primary phase shifting means, a secondary phase shifting means connected between said source and said circuit means, and means responsive to actuation of said primary phase shifting means to control operation of said secondary phase shifting means.

3. A vapor electric conversion system comprising a polyphase alternating current supply circuit, a direct current load circuit, a plurality of pairs of alternately conducting valves of the make-alive type interconnecting said circuits, a make-alive electrode for each of said valves, an impulsing circuit for each of said pairs of valves, a phase shifting device associated with each of said impulsing circuit selector means for selecting a predetermined load characteristic, means energized through said selector means for actuating said phase shifting means to produce the selected load characteristic, a source of control potential connected to said impulsing circuits, phase shifting means interposed between said source and said impulsing circuits and means energized after a predetermined actuation of said first mentioned phase shifting means to actuate said second mentioned phase shifting means.

4. An electric translating system interconnecting a polyphase alternating current circuit and a load circuit comprising a plurality of parallel operating vapor electric valves, an exciting electrode for each of said valves, a source of periodic control potential, circuit means energized from said source for applying exciting impulses to said exciting electrodes, phase shifting means for advancing or retarding the exciting impulses, selector means associated with said load circuit, means energized through said selector means for actuating said phase shifting means, a second phase shifting device interposed between said source and said circuit means for controlling the phase of the potential supplied to said circuit means and means responsive to the actuation of said phase shifting means to actuate said second phase shifting device.

5. A vapor electric conversion system interconnecting an alternating current supply circuit and a load circuit comprising at least a pair of alternately conducting valves of the make-alive type, a make-alive electrode in each of said valves, a source of periodic control potential, an impulsing circuit of the wave distorter type energized from said source and connected to said make-alive electrodes, a phase shifting network including a variable reactor associated with said wave distorter circuit, a source of bias potential associated with said variable reactor, potential control means for varying the potential of said source to vary the reactance of said variable reactor, means responsive to a predetermined load condition for actuating said potential control means, a second phase shifting device for controlling the phase of the potential applied to said phase shifting network and means responsive to a predetermined variation of said bias potential for actuating said phase shifting device.

6. An electric current conversion system for controlling the load condition of a load circuit supplied from an alternating current circuit comprising a plurality of electric valves interconnecting said circuits, an excitation electrode in each of said valves, a source of alternating current control potential, circuit means energized from said source and connected to said exciting electrodes for impressing current impulses thereon for periodically establishing a cathode spot in said valves, a phase shifting network including a variable reactor for advancing or retarding the instant of cathode spot formation, a control winding on said variable reactor, a source of potential connected to said winding, a variable resistor for controlling current flow through said winding, selector means for selecting a load condition, and means energized through said selector means for varying said variable resistor, a second phase shifting device and means for actuating said second phase shifting device for maintaining said phase shifting network within the operating range selected by said selector means.

7. An electric current conversion system for controlling a load circuit supplied from an alternating current circuit comprising a plurality of electric valves interconnecting said circuits, an excitation electrode in each of said valves, a source of periodic excitation potential, circuit means energized from said source and connected to excitation electrodes for periodically impressing current impulses on said electrodes to initiate cathode spots in the valves, a phase shifting device operable over a relatively narrow range for advancing or retarding the phase relation of said current impulses, selector means associated with the load circuit, adjusting means energized through said selector means to operate said phase shifting device, a second phase shifting device operable over a relatively wide range and means for operating said second phase shifter device to maintain the regulation within the range of said first phase shifter device.

HERBERT A. ROSE.